US006863443B2

(12) United States Patent
Mahling

(10) Patent No.: US 6,863,443 B2
(45) Date of Patent: Mar. 8, 2005

(54) BEARING

(75) Inventor: Andreas Mahling, Muellheim (DE)

(73) Assignee: Carl Freudenberg KG, Weinheim (DE)

(*) Notice: Subject to any disclaimer, the term of this patent is extended or adjusted under 35 U.S.C. 154(b) by 28 days.

(21) Appl. No.: 10/289,586

(22) Filed: Nov. 7, 2002

(65) Prior Publication Data
US 2003/0091254 A1 May 15, 2003

(30) Foreign Application Priority Data

Nov. 9, 2001 (DE) .......................... 101 54 705

(51) Int. Cl.⁷ .............................................. F16C 27/00
(52) U.S. Cl. ...................................................... 384/536
(58) Field of Search ................................ 384/535, 536, 384/581, 582; 180/381

(56) References Cited

U.S. PATENT DOCUMENTS

| 3,306,679 A | * | 2/1967 | Stokely ...................... 384/536 |
| 3,309,154 A | * | 3/1967 | Stokely ...................... 384/536 |
| 3,955,861 A | * | 5/1976 | Orain ......................... 180/381 |
| 4,403,812 A | * | 9/1983 | Stephan ...................... 384/536 |
| 4,708,498 A | * | 11/1987 | Labedan et al. ............. 384/582 |
| 6,296,394 B1 | | 10/2001 | Braun et al. ................. 384/535 |

FOREIGN PATENT DOCUMENTS

| DE | 1788708 | 5/1959 |
| DE | 2347446 | 4/1974 |
| DE | 3029550 | 10/1982 |
| DE | 3446518 | 7/1986 |
| DE | 19755563 | 2/1999 |
| EP | 0544986 | 6/1993 |
| GB | 1439586 | 6/1976 |

* cited by examiner

Primary Examiner—Thomas R. Hannon
(74) Attorney, Agent, or Firm—Davidson, Davidson & Kappel, LLC

(57) ABSTRACT

A bearing including an inner ring an outer ring surrounding the inner ring with a radial clearance between the inner and outer ring, an annular inner supporting body disposed in the radial clearance, and an annular outer supporting body surrounding the inner supporting body circumferentially in a torsionally fixed manner and being displaceable with respect to the inner supporting body in an axial direction. The inner and outer supporting bodies join the inner and outer rings radially in a flexibly compliant manner.

12 Claims, 7 Drawing Sheets

BEARING

CROSS-REFERENCE TO RELATED APPLICATIONS

This application claims priority to German Application No. DE 101 54 705.6-12, filed Nov. 9, 2001, which is incorporated by reference herein.

BACKGROUND INFORMATION

The present invention is directed to a bearing having an inner ring and an outer ring surrounding the inner ring with radial clearance, the rings being joined to one another in the radial direction in a flexibly compliant manner.

A bearing of this kind is known from the EP 0 544 986 B1. The inner ring and the outer ring are disposed coaxially to one another and joined in a flexibly compliant manner in the radial direction by a bellows element of elastomer material. The bellows element has a profile having at least one axially protruding fold and is made of a thermoplastic elastomer material.

It is noted in this context, however, that a functional relationship exists between the vibration isolation in the radial direction and the axial displaceability of the inner and outer ring relative to one another; the axially protruding fold has an effect on both functions. The functions cannot be optimized separately from one another. In response to a shifting of the inner ring and outer ring in the axial direction relatively to one another, the bellows element is subjected, moreover, to service life-reducing flexing strains. This is not very satisfactory with regard to consistently good working properties over a long service life.

SUMMARY OF THE INVENTION

An object of the present invention is to further refine a bearing of the type mentioned at the outset in a way that will achieve a functional separation between the vibration isolation in the radial direction and the axial displaceability of the inner and outer ring relative to one another, thereby enabling both functions to be adapted separately from one another, simply and effectively, to the particular conditions of the application case. It is, moreover, an aim of the present invention to increase the service life while maintaining invariably good working properties.

A bearing is provided including an inner ring and an outer ring surrounding the inner ring with radial clearance; in the gap formed by the clearance at least two supporting bodies being configured which join the inner and the outer ring in a flexibly compliant manner in the radial direction, and in a series connection from a technical functioning standpoint; the supporting bodies being designed as annular inner and outer supporting bodies, respectively; the outer supporting body surrounding the inner supporting body circumferentially in a torsionally fixed manner; and the supporting bodies being positioned so as to be unattached and displaceable with respect to one another in the axial direction. The two supporting bodies, disposed in a series connection from a technical functioning standpoint, make it possible for the bearing according to the present invention to be adapted very effectively to the particular circumstances of the application case, with respect to vibration isolation in the radial direction. This adaptation is accomplished, for example, on the basis of the density of the supporting bodies, the prestressing applied to position them inside the gap formed by the clearance between the inner ring and the outer ring, and/or on the basis of the geometry of the supporting bodies. By varying these parameters, the damping or spring characteristic of the bearing, for example, may be adapted to the particular application case. Of particular benefit is, moreover, that an axial displacement of the inner ring and outer ring relatively to one another is always possible, essentially without force, since the two supporting bodies are positioned so as to be unattached and displaceable in the axial direction with respect to one another. The two supporting bodies form a type of sliding tooth-type engagement. Such an axial displaceability is necessary in many application cases, for example when the bearing according to the present invention is used as a drive shaft mounting support. A mounting support of this kind requires, for one, a flexible compliance in the radial direction, to isolate vibrations which are produced by the operating conditions, e.g., introduced to the bearing by a drive shaft, such as from the vehicle floor of a motor vehicle. The torsionally fixed allocation of the two supporting bodies to one another is useful in order to prevent abrasive wear in the area of the points of contact of the two supporting bodies. The axial displaceability of the two supporting bodies with respect to one another is necessary in order to compensate, for example, for axial thermal expansions of the components supported by the bearing, relatively to one another, and/or to compensate for operationally induced axial movements of the supported components.

At least one of the supporting bodies may be made of an elastomer material. Elastomer materials, such as NR, EPDM, are able to be manufactured simply and cost-effectively and have, moreover, the advantage of good temperature stability, good damping properties, and good isolation characteristics.

In accordance with another embodiment, it is possible for at least one of the supporting bodies to be made of a foam plastic. As foam plastic, preferably an MCU foam is used, thus a foam of microcellular urethane. This material is springy and compressible and is, therefore, well suited for a simple assembly of the bearing. Moreover, MCU foam plastics can be very tough and, therefore, durable, which is especially advantageous for the application in a bearing for drive shafts of motor vehicles.

Both supporting bodies are preferably made of an MCU foam, the working properties being adjustable by way of the density, the prestressing, and the geometry of the material, i.e. of the supporting body. In this context, the two supporting bodies may be made of a corresponding material or of materials that differ from one another. The same materials having corresponding working properties are preferably selected when it is considered essential to achieve virtually constant properties with respect to damping and spring characteristic over the circumference of the bearing.

On the other hand, different materials, such as various MCU foam plastics, may be used. A combination of this kind is preferably selected when it appears to be necessary to use a series connection to influence the characteristic properties, such as the spring characteristic.

The supporting bodies may each have a sliding surface on the mutually facing sides, the sliding surfaces making direct contact with one another, and at least one of the sliding surfaces being able to have a friction-reducing surface coating. The optionally used surface coating then forms an integral part of the particular supporting body, so that only the two supporting bodies are configured between the inner ring and the outer ring. A friction-reducing surface coating, which may be made of a PTFE (Phenol-Formaldehyde Thermoplastic Ethylene) lacquer, is used, in particular, when the supporting bodies are made of materials having a high coefficient of friction. In such a case, the surface coating prevents the mutually facing sliding surfaces of the supporting bodies from becoming damaged and/or destroyed when axial displacement occurs. For most application cases, it suffices when the sliding surface of only one supporting body is provided with a friction-reducing surface coating. This facilitates a simple and cost-effective manufacturing.

In accordance with another embodiment, it is possible for the supporting bodies to be braced against one another in the radial direction by a slide ring. The slide ring may be made, for example, of a PTFE compound and be adhesively attached to only one of the supporting bodies. Such an attachment is preferably made at the inner supporting body, since the surface of the slide ring facing the outer supporting body is larger than the surface facing the inner ring; as a result, the mechanical stressing of the outer surface of the slide ring is comparatively less.

The additional slide ring is preferably used when, during operation, especially frequent axial movements arise between the supporting bodies.

One drawback that works against the aforementioned advantages is that the slide ring is a component that needs to be separately manufactured and assembled. However, in view of the advantages for special application cases, this drawback is insignificant.

The inner and/or the outer ring may be made of a polymer material. In contrast to rings made of a metallic material, it is advantageous in this connection that rings of this kind are rust free. Moreover, the rings of polymer material have only a small mass and are simple and inexpensive to manufacture.

The inner ring and the inner supporting body, and/or the outer ring and the outer supporting body may be joined to one another with force and/or form locking (i.e. non-positively and/or positively). Given a non-adhesive attachment of the supporting bodies to the radially adjoining rings, it is beneficial that the entire bearing may be disassembled following use, and undergo a segregated recycling. Moreover, parts that are subject to wear are easily replaceable. Thus, it is possible, for example, to replace the inner and/or the outer supporting body without having to likewise exchange the inner ring and/or the outer ring. A form-locking connection of the inner ring and the inner supporting body, and/or of the outer ring and the outer supporting body may be accomplished, for example, by providing the inner ring and/or the outer ring with an undercut into which the inner supporting body and/or the outer supporting body are able to snap into place. A force-locking connection may be established in that the inner ring and the inner supporting body and/or the outer ring and the outer supporting body are joined to one another by a press fit.

Together with a rolling-contact bearing or a friction bearing, the inner ring may form a preassemblable unit. Rolling-contact bearings are preferably used when the intended use of the bearing is, for example, as a drive shaft support in motor vehicles. On the other hand, friction bearings are used when the installation space in the radial direction only has small dimensions, making it impractical to use commercial rolling-contact bearings in the radial direction because of their substantial overall height. By combining the inner ring with the rolling-contact bearing or the friction bearing for the particular preassemblable unit, the result is a design requiring few parts, so that the assembly of the bearing according to the present invention is substantially simplified, the assembly of the preassem blable unit being especially simple when the rolling-contact bearing or the friction bearing are joined in a snap-fit connection with the inner ring.

BRIEF DESCRIPTION OF THE DRAWINGS

The subject matter of the present invention is clarified in greater detail in the following on the basis of FIGS. 1 through 6. The figures show.

DETAILED DESCRIPTION

Figure 1:
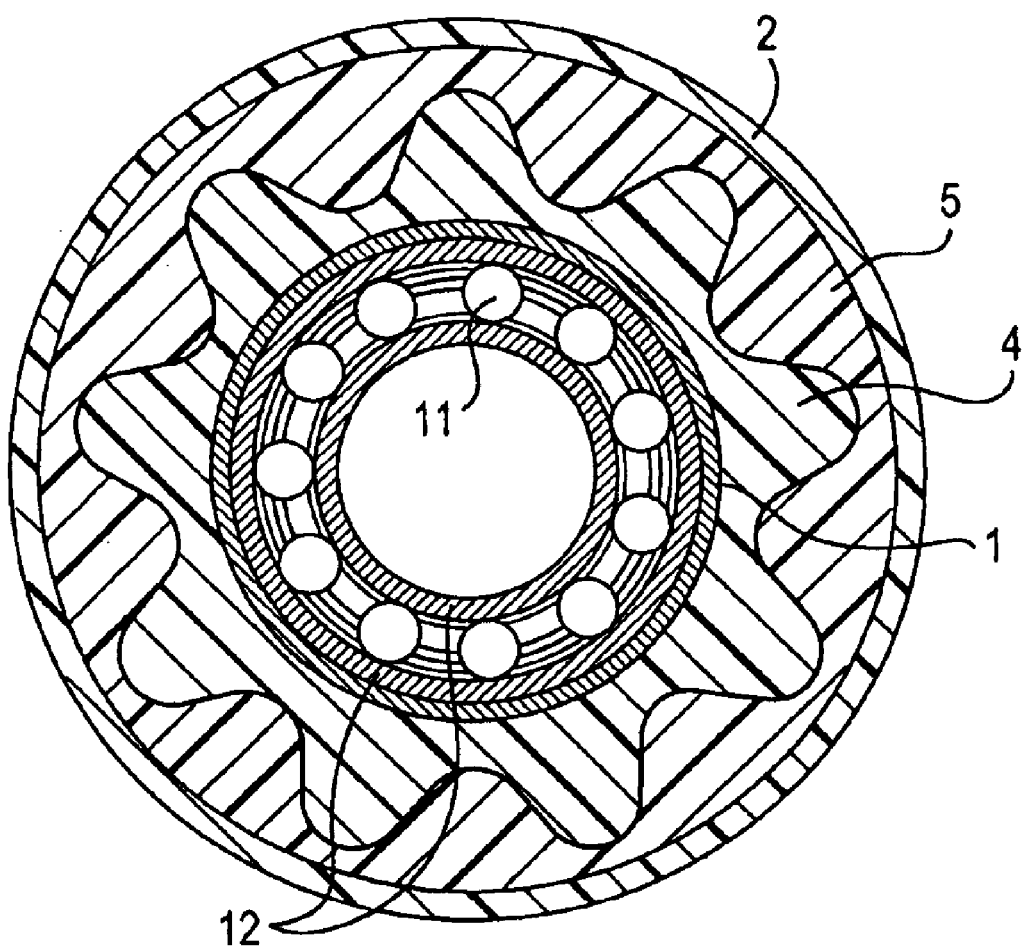
FIG. 1 a first exemplary embodiment of a bearing in a transverse section.

Three exemplary embodiments of a bearing are shown in FIGS. 1 through 6, the bearings being used as drive-shaft bearings in motor vehicles. The bearings of the three exemplary embodiments each include an inner ring 1, which is surrounded with radial clearance by an outer ring 2. In the exemplary embodiments, both inner ring 1 as well as the outer ring 2 are made of a tough polymer material. Set in gap 3 formed by the clearance are two supporting bodies 4, 5, which brace inner ring 2 and outer ring 2 against one another in the radial direction in a flexibly compliant manner. Viewed in the radial direction, the two supporting bodies 4, 5 are arranged in a series connection from a technical functioning standpoint. Inner ring 1, outer ring 2, and supporting bodies 4, 5 are positioned concentrically to one another and have an annular design. On the other hand, viewed in cross-section, the mutually facing surfaces of the two supporting bodies 4, 5, thus the inner circumference of outer ring 2 and the outer circumference of inner ring 1, have an undulated design in the circumferential direction, so that the result is a torsionally fixed allocation of the two supporting bodies 4, 5 to one another, essentially produced by form locking, although these bodies are allocated to one another so as to be unattached and displaceable in the axial direction.

Supporting bodies 4, 5 may be made of an elastomer material or, as in the described exemplary embodiments, of a microcellular urethane foam (MCU foam).

The axial displaceability of the two supporting bodies 4, 5 relatively to one another, which is the most low-friction possible and, therefore, essentially without force, is necessary in order to be able to compensate for operationally induced changes in the length of the supported shaft—and, thus, of inner ring 1 with respect to outer ring 2—and/or of a housing (not shown here). The structures for bracing inner ring l and outer ring 2 against one another are subjected only to a radial compressive load, not, however, to service life-reducing thrust loads/shear stresses.

In the exemplary embodiments shown here, illustrated rolling-contact bearing 11 and friction bearing 13, together with inner ring 1, form a preassemblable unit 12, 14, in each instance, rolling-contact bearing 11 or friction bearing 13 being joined in a snap-fit connection, i.e., with form locking, to inner ring 1.

The two supporting bodies 4, 5 are attached non-adhesively to radially adjoining rings 1, 2, respectively, so that in the event of wear and/or damage, the individual parts are able to be replaced separately.

Figure 2A:
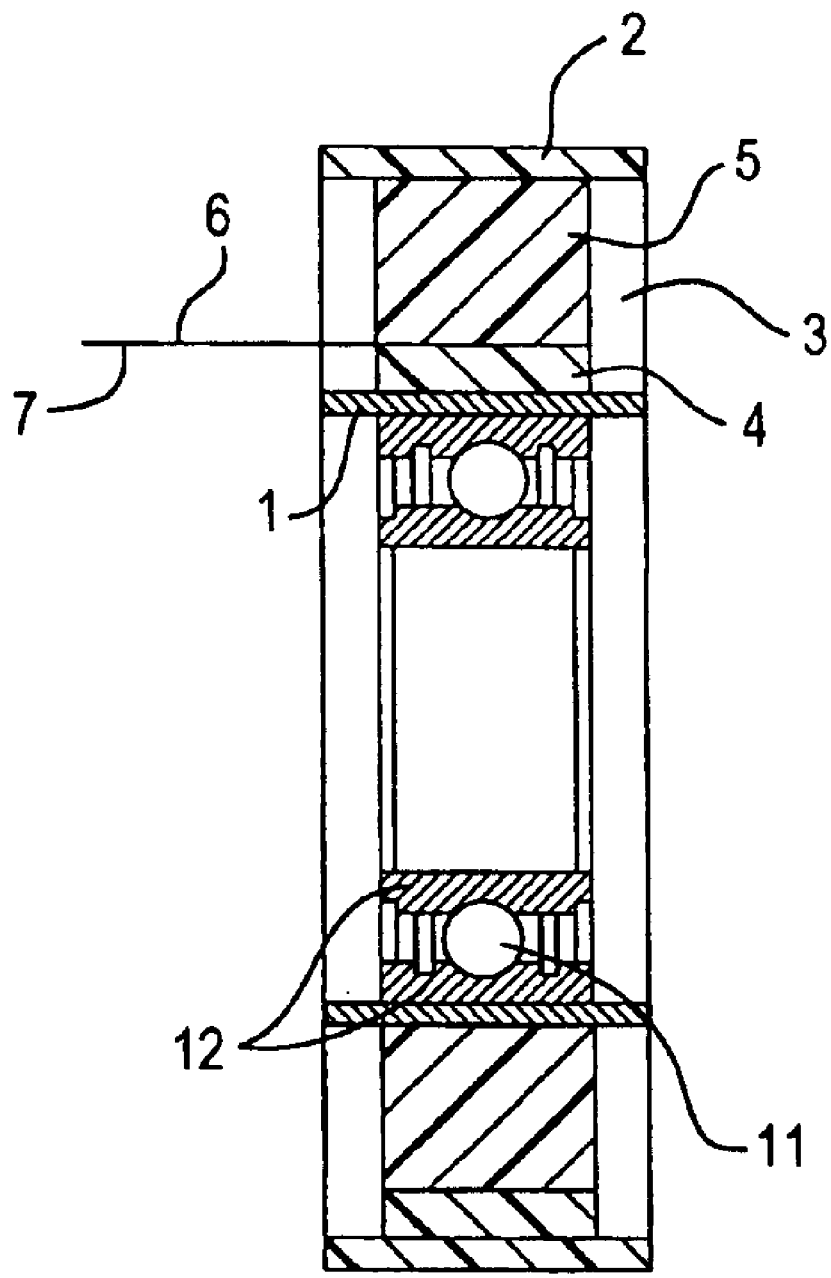
FIG. 2 the bearing of FIG. 1 in a longitudinal section.
Figure 2B:
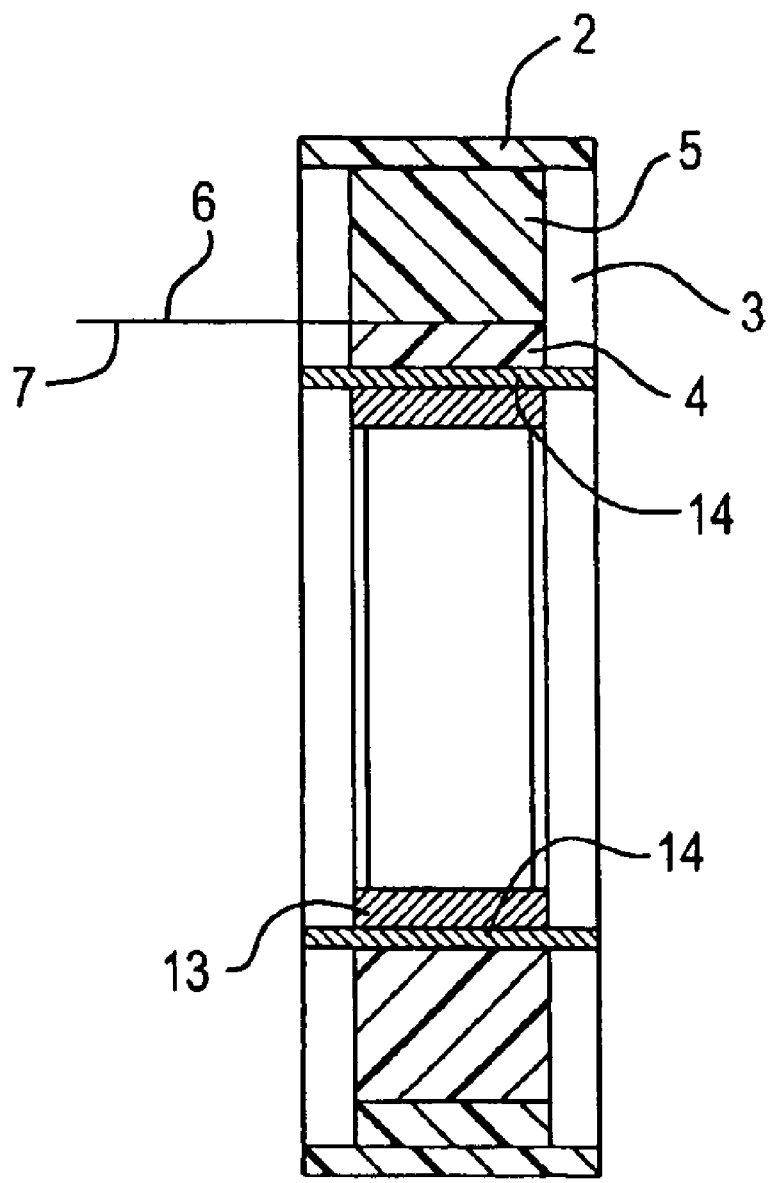

A first exemplary embodiment of the bearing is shown in FIGS. 1, 2a and 2b. Outer supporting body 5 surrounds inner supporting body 4 circumferentially in a torsionally fixed manner, supporting bodies 4, 5 being braced against one another by their sliding surfaces 6, 7 so as to be displaceable in the axial direction. In the exemplary embodiment shown here, sliding surfaces 6, 7 of supporting bodies 4, 5 rest directly against one another.

FIG. 2a differs from FIG. 2b exclusively in that, in FIG. 2a, a preassemblable unit 12 is used, which includes inner ring 1 and rolling-contact bearing 11, and, in FIG. 2b, a preassemblable unit 14 is used, which includes inner ring 1 and a friction bearing 13.

Figure 3:
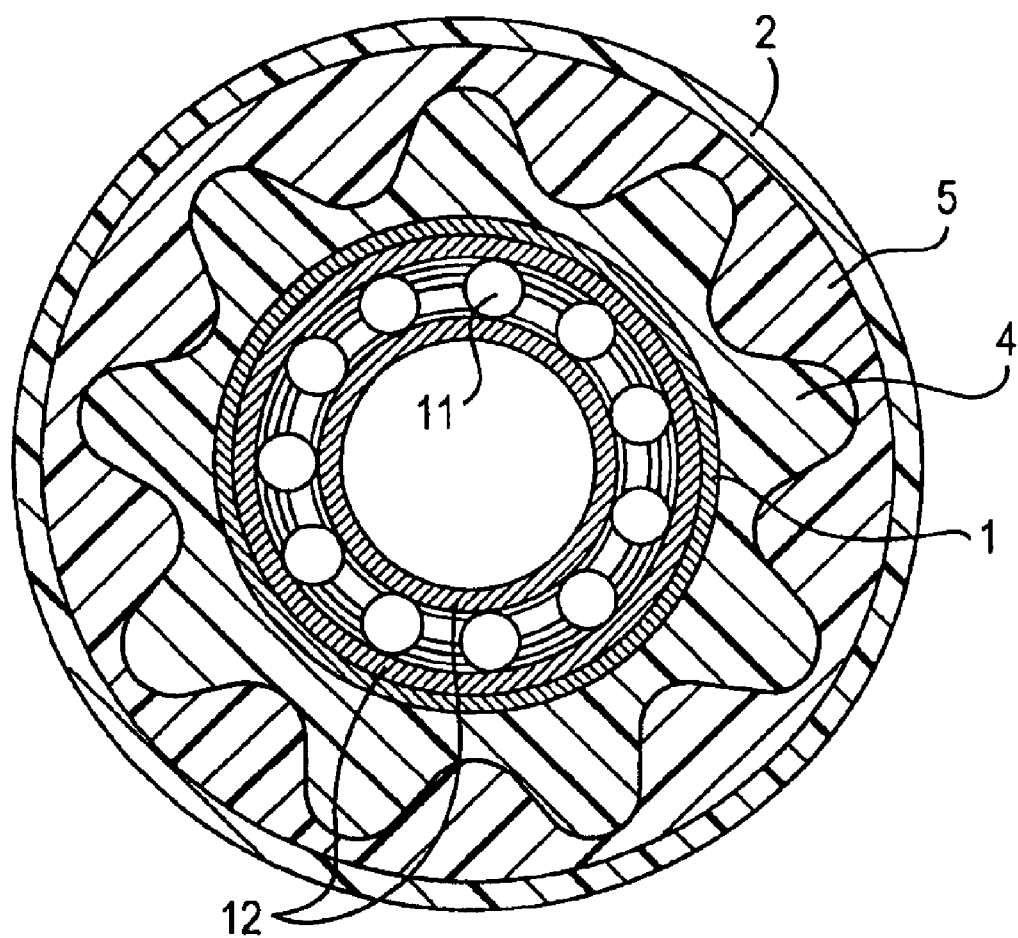
FIG. 3 a second exemplary embodiment of a bearing in a transverse section.
Figure 4A:
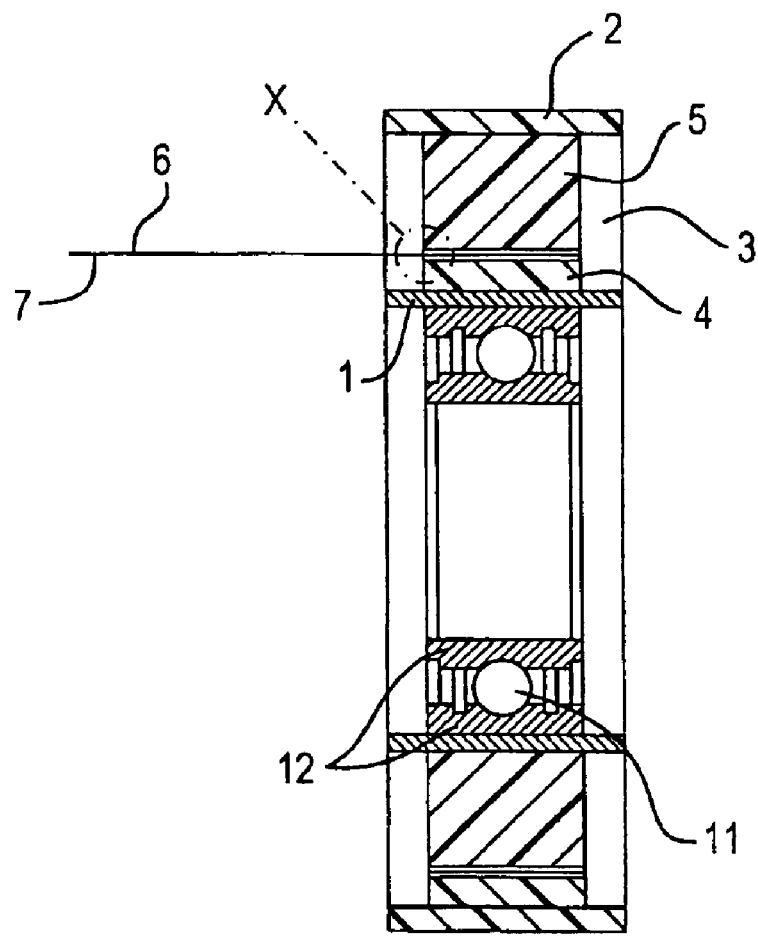
FIG. 4 the bearing of FIG. 3 in a longitudinal section.
Figure 4B:
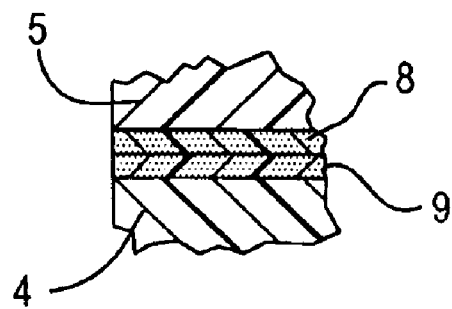

FIGS. 3 and 4 depict a bearing similar to the bearing of FIGS. 1 and 2a, the two sliding surfaces 6, 7 of supporting bodies 4, 5 being provided with a friction-reducing surface coating 8, 9, respectively, for example with a surface coating 8, 9 of PTFE. Departing from the specific embodiment shown here, it is also possible to provide only one of sliding surfaces 6, 7 with a surface coating 8, 9.

Figure 5:
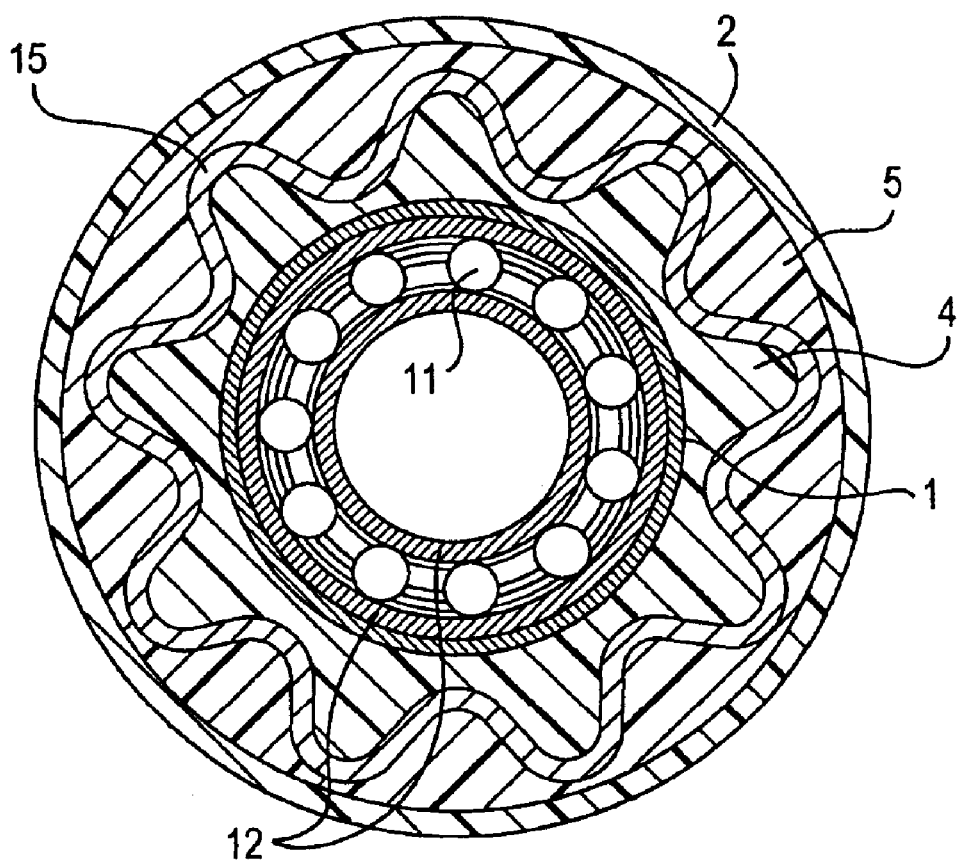
FIG. 5 a third exemplary embodiment of a bearing in a transverse section.
Figure 6:
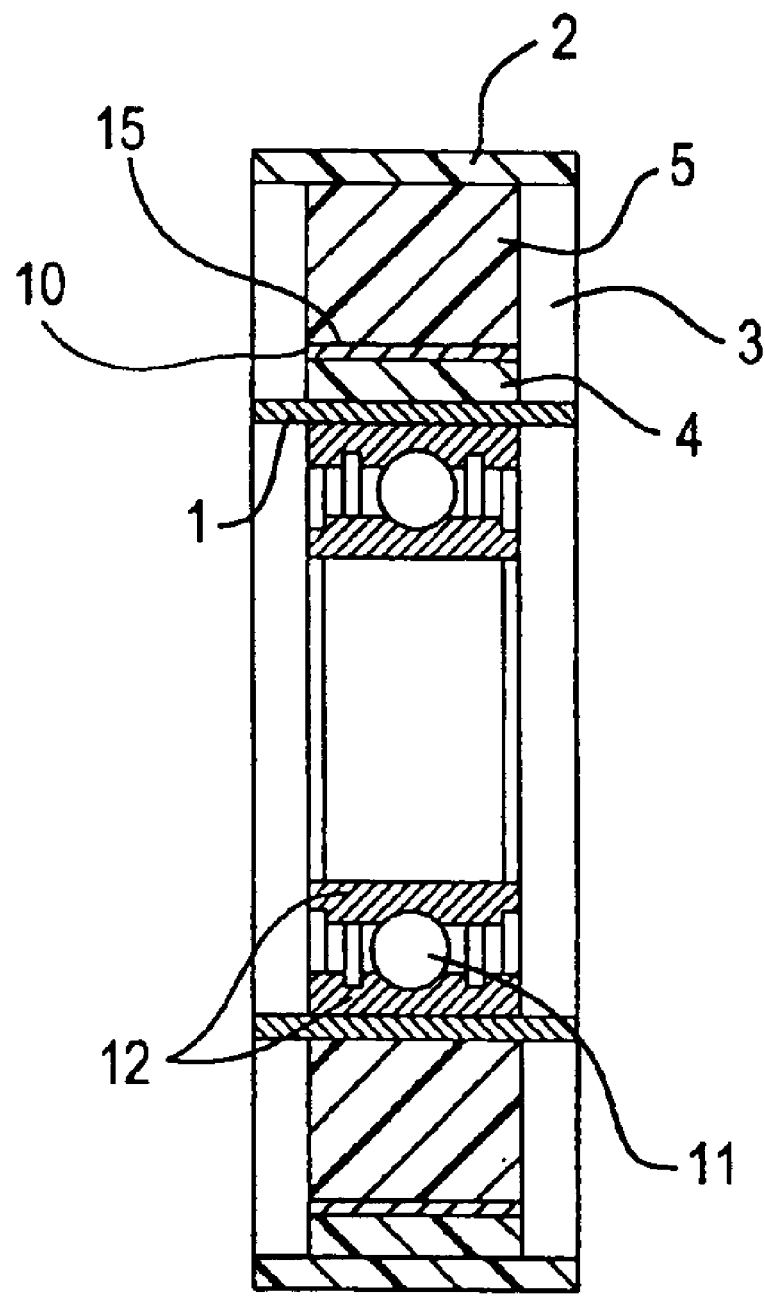
FIG. 6 the bearing of FIG. 5 in a longitudinal section.

The exemplary embodiment of FIGS. 5 and 6 differs from the previously described exemplary embodiments in that supporting bodies 4, 5 are braced against one another in the radial direction, in a flexibly compliant manner, by a slide ring 10, which, in this exemplary embodiment, is a PTFE ring. The slide ring is preferably permanently connected, for example bonded, to inner ring 1. The axial displaceability is ensured in that outer circumferential surface 15 of slide ring 10 is assigned to sliding surface 7 of outer supporting body 5 non-adhesively and displaceably in the axial direction. The advantage of such a design is that, for the inner ring, materials may also be used which have an exceptionally high coefficient of friction and/or an especially sensitive surface.

Conversely, it is also possible to connect slide ring 10 to the inner circumferential surface of outer supporting body 5; the relative movement in the axial direction is then executed between the inner circumferential surface of slide ring 10 and the outer circumferential surface of inner supporting body 4.

What is claimed is:

1. A bearing, comprising:
   an inner ring;
   an outer ring surrounding the inner ring with a radial clearance between the inner and outer rings;
   an annular inner supporting body disposed in the radial clearance; and
   an annular outer supporting body surrounding the inner supporting body circumferentially in a torsionally fixed manner and being displaceable with respect to the inner supporting body in an axial direction, the inner and outer supporting bodies joining the inner and outer rings radially in a flexibly compliant manner.

2. The bearing as recited in claim 1 wherein at least one of the inner and outer supporting bodies includes an elastomer material.

3. The bearing as recited in claim 1, wherein at least one of the inner and outer supporting bodies includes a foam plastic.

4. The bearing as recited in claim 1, wherein each of the inner and outer supporting bodies includes a sliding surface on a mutually facing side so that the sliding surface of the inner supporting body makes direct contact with the sliding surface of the outer supporting body.

5. The bearing as recited in claim 1, wherein the sliding surface on at least one of the inner and outer supporting bodies includes a friction-reducing surface coating.

6. The bearing as recited in claim 1 further comprising a slide ring for bracing the inner and outer supporting bodies against one another radially.

7. The bearing as recited in claim 1 wherein at least one of the inner and outer rings include a polymer material.

8. The bearing as recited in claim 1 wherein the inner ring is joined to the inner supporting body using a force locking or form locking fit.

9. The bearing as recited in claim 1 wherein the outer ring is joined to the outer supporting body using a force locking or a form locking fit.

10. The bearing as recited in claim 1 further comprising an inner bearing and wherein the inner ring and the inner bearing form a preassemblable unit.

11. The bearing as recited in claim 10 wherein the inner bearing is one of a rolling-contact bearing and a friction bearing.

12. The bearing as recited in claim 10 wherein the inner bearing is joined to the inner ring in a snap-fit connection.

* * * * *